Patented Sept. 12, 1922.

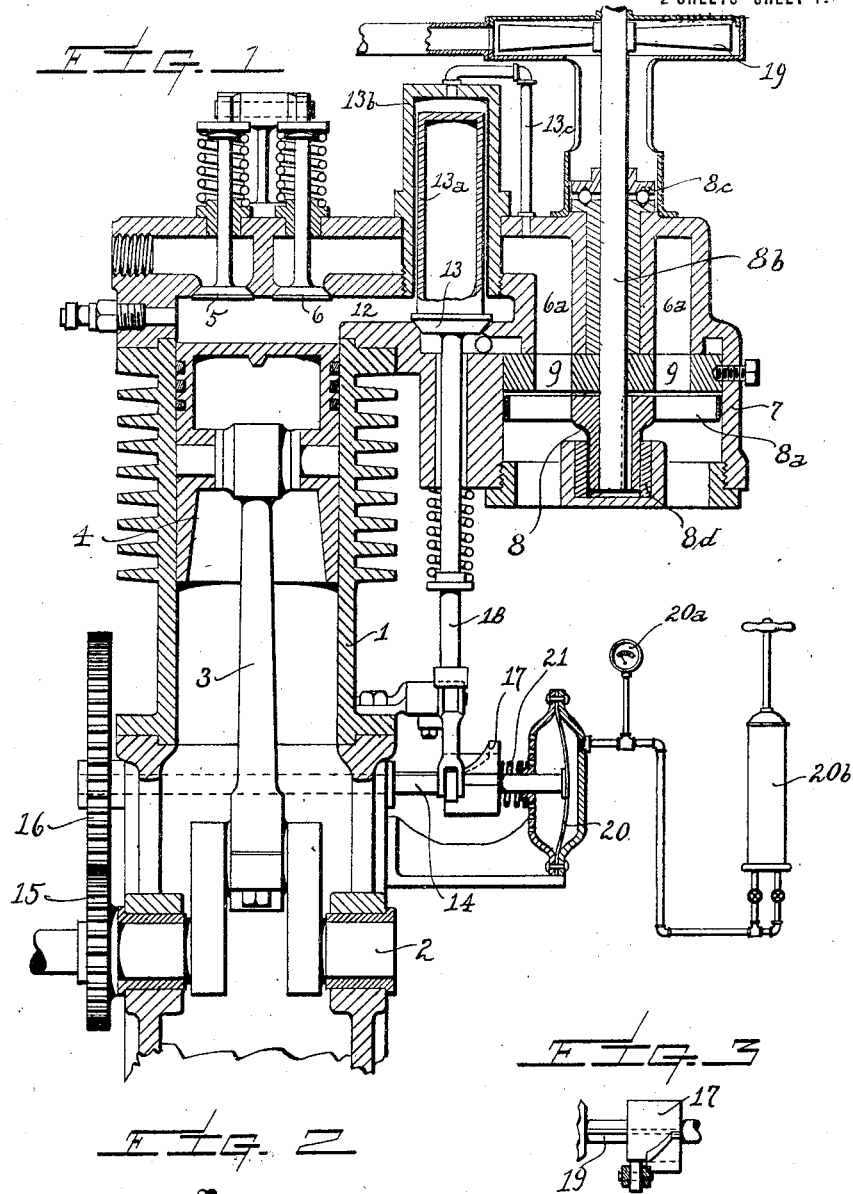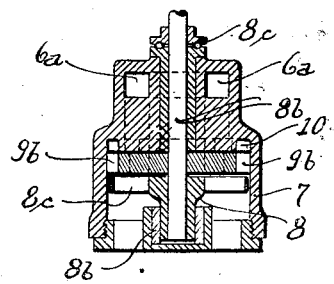

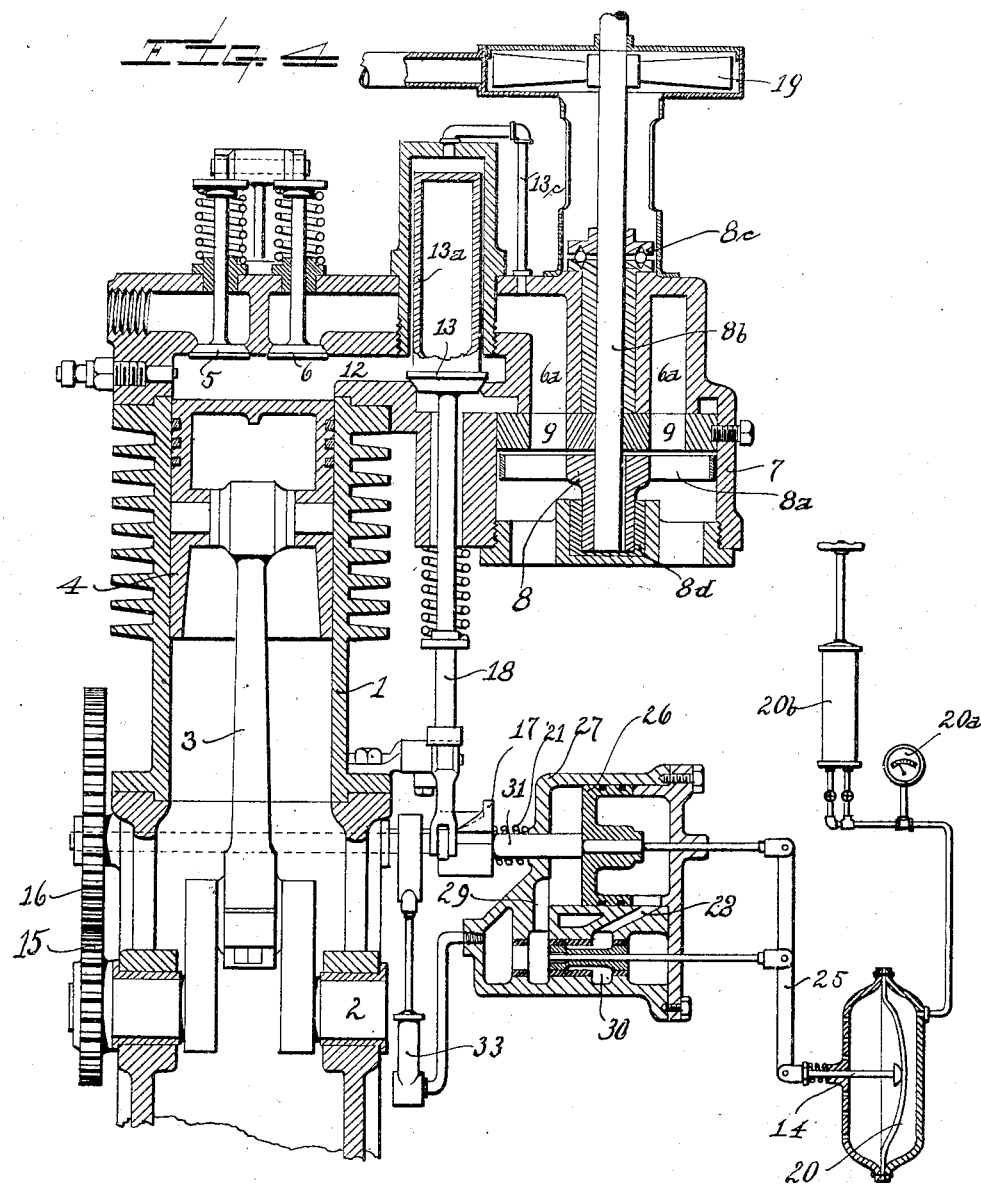

1,428,925

UNITED STATES PATENT OFFICE.

CARL C. THOMAS, OF BALTIMORE, MARYLAND.

SUPERCHARGER FOR INTERNAL-COMBUSTION ENGINES.

Application filed June 29, 1920. Serial No. 392,797.

*To all whom it may concern:*

Be it known that I, CARL C. THOMAS, a citizen of the United States of America, and a resident of the city of Baltimore, State of Maryland, have invented certain new and useful Improvements in Superchargers for Internal-Combustion Engines, of which the following is a specification.

My invention relates to superchargers for internal combustion engines, particularly aeroplane engines, and embodies the application of the inventions of my Patents Nos. 1,147,280 dated July 20, 1915, and No. 1,152,361 dated August 31, 1915, to the driving of such superchargers, together with automatic control of the drive of the supercharger, in accordance with varying atmospheric pressure.

In the operation of aeroplanes driven by internal combustion engines, it has been found that an engine adjusted to operate well at from sea level atmospheric pressure to one or two thousand feet elevation, does not work so well at very high elevations. To remedy this condition the so-called supercharger has been developed, the supercharger being a device of the nature of a fan, driven usually by a turbine operated by the exhaust of the engine, which fan or blower forces air under less or greater pressure into the air intake of the engine, the object being to increase the pressure at the intake so that, as atmospheric pressure falls considerably due to increased elevation, the pressure in the air intake is increased to that, or approximately that, pressure, to which the engine is adjusted for operation under normal conditions. But obviously this fan or blower should be arranged to give higher relative pressures as elevation increases; while on the other hand the power of the engine, and therefore the power of the exhaust turbine driving the supercharger, tends to decrease as the elevation of the plane increases; in other words, whereas the power of the turbine driving the supercharger should increase with increased elevation, the contrary is the case, where on special control means is provided.

According to the inventions of my said patents, an exhaust-driven turbine is provided, driven by the exhaust of the engine, and also driven in part by gas withdrawn from the engine cylinder or cylinders during the early portion of the working stroke, which gases, therefore, are withdrawn from the engine cylinder while at relatively high pressure. According to my present invention I use the turbine of my said prior patents for driving the supercharger, and provide automatic control means whereby as the external pressure falls, the proportion of gas withdrawn from the engine cylinder or cylinders during the early portion of the working stroke, is increased, so giving increased power for the operation of the turbine driving the supercharger.

The object of my invention is, therefore, to vary the power of the turbine driving the supercharger in accordance with the varying demand for power to drive the supercharger, and, more or less approximately, in inverse proportion to the varying atmospheric pressure.

I will now proceed to describe my invention with reference to the accompanying drawings, and will then point out the novel features in claims:

Figure 1 shows a fragmentary central vertical section of an internal combustion engine, indicated diagrammatically only, in connection with an exhaust turbine and a superharger also indicated diagrammatically only and in central vertical section, and in connection with automatic control means indicated partly in central vertical section and partly in elevation, but indicated diagrammatically only.

Figure 2 shows a central vertical section of the turbine itself on a slightly different plane from that of the section of Figure 1, the section being so taken in order that one of the high pressure gas nozzles of the turbine may be visible.

Figure 3 shows a fragmentary top view of the cam for determining the action of the supplemental exhaust valve, and associated means; the valve rod lifter operated by this cam being shown in section.

Figure 4 shows a view similar to Figure 1, except that the use of relay mechanism between the automatic control device and the mechanism for operating the supplemental exhaust valve is shown; this relay mechanism being shown in central vertical section, and, in the main, diagrammatically only.

In the drawings, 1 designates an engine cylinder (shown in this case as an air cooled cylinder provided with the usual radiating ribs), 2 the crank shaft, 3 the connecting rod and 4 the piston.

I have shown an engine of what is known as the four-cycle type, but in a broad sense it is immaterial whether the engine employed be of the four-cycle or of the two-cycle type. Also, I have shown one cylinder only whereas aeroplane engines commonly comprise a number of cylinders; but the principles herein described with reference to the regulation of pressure of the gases driving the turbine, are obviously applicable to any engine, independent of the number of cylinders thereof, so that illustration of the invention as applied to one cylinder only is sufficiently indicative to persons skilled in the art of the application of the invention to multicylinder engines of any type.

The engine shown is provided with the usual admission valve 5 and exhaust valve 6.

7 designates the turbine casing, which in this instance is formed integral with, and as a projection from, the removable head of the engine cylinder.

8 designates the rotor of the turbine comprising a series of turbine blades 8ª mounted upon the vertical shaft 8ᵇ supported by a suitable step-bearing 8ᶜ, a steadying bearing 8ᵈ being provided at the lower end of the rotor.

9—9 designate a plurality of exhaust gas nozzles formed in a nozzle ring 9ª fitted within the turbine casing 7, and suitably supported. These exhaust nozzles 9 project gas against the inner portion of the blades 8ª.

The nozzle ring is also provided with other high pressure nozzles 9ᵇ (see Figure 2) communicating with an annular passage 10 surrounding the exhaust passage 6ª in the turbine casing, which passage is arranged to receive high pressure gases from the engine cylinder 1, through a port 12 leading from the upper end of that cylinder. A valve 13 controls the passage of the high pressure gas from port 12 to annular chamber 10; and this valve is operated by suitable mechanism hereinafter described. In order that it may not be necessary to open the valve 13 against the pressure of the engine cylinder exerted on the interior head of the valve, I may provide said valve with an extension 13ª working within a packing cylinder 13ᵇ. In practice, this cylinder 13ᵇ fits quite closely to the valve extension 13ª. In the drawings slight clearance is shown for clearness of illustration. Such leakage as may take place between the valve extension 13ª, and packing cylinder 13ᵇ is vented through a duct 13ᶜ into the exhaust passage 6ª.

For operating the inlet valve 5 and exhaust valve 6 I have indicated ordinary valve mechanism comprising reducing gears 15 and 16 driving a cam shaft 14, upon which may be assumed to be suitable cams for operating the valve gear of the valves 5 and 6. A taper cam 17 on shaft 14 is provided for operating the valve rod 18 of the valve 13. By adjusting this cam 17, along the shaft, the period during which the valve 13 remains open may be varied, or the cam may be moved to such position that the valve 13 does not open at all. Preferably the cam 17 is of such design that the valve 13 always opens at about the same portion of the stroke of the piston 4, the variation in the duration of the period of opening of this valve being effected by varying the point of closure of this valve, or cut-off, with respect to the stroke of piston 4. Thereby the proportion of gases delivered from the engine cylinder to the turbine, to the gases retained within that engine cylinder to operate the engine, and to permit the engine to do external work, may be varied, as desired.

As so far described, the engine and turbine are practically the same as the engine and turbine of my said Patent No. 1,152,361.

19 designates the supercharger. As the present invention does not relate to the construction of the supercharger itself, I have illustrated the supercharger diagrammatically only, as a fan, the rotor of which is mounted upon the shaft 8ᵇ, of the turbine.

As explained above, it is desirable that as the external air pressure decreases, due to increased elevation of the plane, the proportion of high pressure gas delivered to the turbine by valve 13 shall increase. To this end I provide automatic means for adjusting the cam 17. In the arrangement shown in Figures 1 and 3 this means comprises a diaphragm 20 exposed on one side to atmospheric pressure, and on the other side possibly to less than atmospheric pressure, (the space back of the diaphragm being exhausted), and acted upon, in opposition to atmospheric pressure, by a spring 21. Obviously, as air pressure decreases, due to increasing altitude, the spring will move the cam 17 to increase the period during which valve 13 remains open. The adustment may be such that valve 13 is not opened at all until the elevation reaches some predetermined figure, say approximately three thousand feet; after which the valve is opened for progressively prolonged periods, as elevation increases, or, to speak more correctly, as atmospheric pressure decreases.

But it is to be understood that the above described method of operation of the diaphragm 20 and spring 21, with means, such as the pump, for varying conversely the pressure differential on the two sides of the diaphragm, is only one of the various possible methods of operative control, since the operator, by maintaining pressure behind the diaphragm either greater than or less than atmospheric pressure obtaining at the moment, may introduce wide differences in the operation of the automatic control device.

If desired the automatic control device, instead of acting to shift the cam 17 directly, may operate a relay mechanism; for example, a pilot valve mechanism of the general nature of the mechanisms commonly employed for governor control of the inlet valves of steam turbines. Figure 4 illustrates such an arrangement, wherein 24 designates a rod operated by the diaphragm and its spring, and connected at one end to a link 25 connected to the piston 26 of a fluid pressure cylinder 27 having inlet and outlet ducts 28 and 29, controlled by a pilot valve 30, itself connected to the link 25 at an intermediate point. The piston 26 is connected by a rod 31 to the cam 32. Fluid under pressure for the operation of the piston 26 may be obtained from any suitable source, for example, a pressure lubricating system for the engine, driven by a pump 33. It will be understood that as the diaphragm moves the pilot valve is shifted to admit oil under pressure to one side or the other of the piston 26, which piston thereupon operates to shift the cam 17, and in so doing operates the pilot valve to cut off the supply of oil under pressure to the cylinder 27.

It will of course be understood that the automatic control device, whether it operates directly through a relay mechanism, may operate any means for the control of the supply of gas to the turbine, and I do not limit myself to any particular means for that purpose.

What I claim is:

1. The combination with an internal combustion engine provided with a cylinder and with means for the exhaust of products of combustion from that cylinder, of a turbine, a duct connecting the said cylinder to the said turbine, means controlling flow through said duct arranged to permit flow from said cylinder direct to the turbine during the early portion of the working stroke, a super-charger driven by said turbine, and means controlled by varying atmospheric pressure arranged to regulate flow through said duct to the turbine.

2. The combination with an internal combustion engine having a cylinder, having an exhaust port and having also a further discharge port and means controlling flow through said exhaust port and through said discharge port, arranged to open the exhaust port near the end of the working stroke, and to open such discharge port at an earlier point in the working stroke, of a mixed pressure turbine arranged to receive the discharge from both such ports, a supercharger driven by said turbine, and means controlled by varying atmospheric pressure and arranged to control the opening of such discharge port in accordance with varying atmospheric pressure.

3. The combination with an internal combustion engine provided with a cylinder and with means for the exhaust of products of combustion from that cylinder, of a turbine, a duct connecting the said cylinder to the said turbine, means controlling flow through said duct arranged to permit flow from said cylinder to the turbine during the early portion of the working stroke, a supercharger driven by said turbine, a diaphragm device comprising a diaphragm exposed on one side to atmospheric pressure, elastic pressure means acting upon said diaphragm in opposition to the action of atmospheric pressure thereon, a relay mechanism actuated by said diaphragm, and means actuated by said relay mechanism to regulate flow through said duct to the turbine.

4. The combination with an internal combustion engine provided with a cylinder and with means for the exhaust of products of combustion from that cylinder, including both an exhaust port and a further discharge port and means controlling flow through said exhaust port and through such discharge port, arranged to open such discharge port at an earlier point in the working stroke than the said exhaust port has opened, of a mixed pressure turbine arranged to receive the discharge from both said ports, a supercharger driven by said turbine, and means controlled by varying atmospheric pressure and arranged to control the opening of such discharge port in accordance with varying atmospheric pressure.

In testimony whereof I have signed this specification in the presence of the subscribing witness.

CARL C. THOMAS.

Witness:
CLARENCE B. CLEMENTS.